(12) United States Patent
Vangala et al.

(10) Patent No.: US 12,141,204 B2
(45) Date of Patent: Nov. 12, 2024

(54) UNIFIED GRAPH GENERATION

(71) Applicant: Microsoft Technology Licensing, LLC, Redmond, WA (US)

(72) Inventors: Vipindeep Vangala, Hyderabad (IN); Long Qiu, Kirkland, WA (US); Rafael Ferreira Barcelos, Kirkland, WA (US); Julien J. T. Pierre, Sammamish, WA (US); Sangita N. Pitre, Hyderabad (IN); Nishchay Kumar, Delhi (IN); Giselli Panontini De Souza, Seattle, WA (US); Juan Diego Ferre, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 56 days.

(21) Appl. No.: 17/854,336

(22) Filed: Jun. 30, 2022

(65) Prior Publication Data

US 2024/0004931 A1 Jan. 4, 2024

(51) Int. Cl.
*G06F 16/00* (2019.01)
*G06F 16/901* (2019.01)
*G06F 16/9038* (2019.01)

(52) U.S. Cl.
CPC ...... *G06F 16/9024* (2019.01); *G06F 16/9038* (2019.01)

(58) Field of Classification Search
None
See application file for complete search history.

(56) References Cited

U.S. PATENT DOCUMENTS

| | | | |
|---|---|---|---|
| 8,429,179 B1* | 4/2013 | Mirhaji | G06F 16/3329 707/756 |
| 11,436,504 B1* | 9/2022 | Lukarski | G06N 5/04 |
| 11,526,771 B2* | 12/2022 | Ragavan | G06F 16/28 |
| 2019/0114342 A1* | 4/2019 | Orun | G06F 16/215 |
| 2019/0361849 A1* | 11/2019 | Rogynskyy | G06F 7/14 |
| 2020/0005153 A1* | 1/2020 | Ramanath | G06F 16/285 |
| 2020/0104321 A1* | 4/2020 | Sharma | G06F 16/212 |
| 2022/0129700 A1* | 4/2022 | Lin | G06F 21/6245 |

(Continued)

OTHER PUBLICATIONS

"International Search Report and Written Opinion Issued in PCT Application No. PCT/US23/022500", Mailed Date: Jul. 26, 2023, 12 Pages.

(Continued)

*Primary Examiner* — Hasanul Mobin

(57) ABSTRACT

A method of generating a unified graph is described. First graph data is received from a first data source, nodes within the first graph data including first, second, and third fields. Second graph data is received from a second data source, nodes within the second graph data including first, second, and fourth fields. The unified graph is generated from the first and second graph data using aggregated fields of the first field and the third field as a unique identifier of a unified schema for nodes within the unified graph having a first type and aggregated fields of the first field and the fourth field as a unique identifier of the unified schema for nodes within the unified graph having a second type, wherein nodes of the unified graph represent entities and edges of the unified graph represent relationships among the entities.

20 Claims, 10 Drawing Sheets

(56) References Cited

U.S. PATENT DOCUMENTS

| | | |
|---|---|---|
| 2022/0382878 A1* | 12/2022 | Maity .................... G06F 16/245 |
| 2022/0414228 A1* | 12/2022 | Difonzo ............ G06F 16/24522 |
| 2023/0045347 A1* | 2/2023 | Grady ...................... G06N 5/02 |
| 2023/0138971 A1* | 5/2023 | Krishnan ............ G06F 16/9024 |
| | | 707/797 |
| 2023/0359667 A1* | 11/2023 | Zionts ................ G06F 16/9024 |

OTHER PUBLICATIONS

"Application as Filed in U.S. Appl. No. 17/681,418", Filed Date: Feb. 25, 2022, 36 Pages.

\* cited by examiner

| | 310 | 320 | | | | | | | 330 |
|---|---|---|---|---|---|---|---|---|---|
| | | Sender | Timestamp | Subject | Author | Language | Template | Display Name | Alias | Map<string, object> |
| Id1 | Type=Email | | | | | Language | | | | |
| Id2 | Type=Document | | | | Author | Language | Template | | | |
| Id3 | Type=Contact | | | | | Language | | Display Name | Alias | |
| Id4 | Type=Email | Sender | Timestamp | Subject | | Language | | | | AttachmentName |
| ↑ | ↑ | ↑ | ↑ | ↑ | ↑ | ↑ | ↑ | ↑ | ↑ | ↑ |
| 312 | 314 | 321 | 322 | 323 | 324 | 325 | 326 | 327 | 328 | 332 |

UNIFIED GRAPH GENERATION

BACKGROUND

Enterprise organizations such as businesses with hundreds or thousands of employees may manage large amounts of data for entities associated with the organization, such as various users (e.g., employees), emails sent by the users, documents generated by the users, meetings attended by the users, etc. These entities may have relationships among themselves, for example, a first user (e.g., a first entity) may have an authorship relationship with a document that they generated (e.g., a second entity). Further relationships may be created or modified when the document is shared with a second user of the organization, included in an email message, or referenced within a meeting invite. Knowledge of these relationships may be leveraged to recommend relevant entities to a user when performing some tasks, such as sending an email (e.g., recommendations for documents to be attached) or composing a meeting invite (e.g., recommendations for users to invite). Data for the entities and relationships may be stored as a data graph having nodes representing the entities and edges between nodes representing the relationships. However, source data for these nodes and edges may originate within, or be related to, different applications. For example, an email application may be used to forward a document between first and second users, while the same document may be shared with a third user by the second user with a social networking application. Data from different data sources may not be readily combinable.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to generating a unified graph.

In one aspect, a computer-implemented method is provided. The method includes: receiving first graph data from a first data source, nodes within the first graph data including at least a first field, a second field, and one or more third fields; receiving second graph data from a second data source, nodes within the second graph data including at least the first field, the second field, and one or more fourth fields; and generating the unified graph from the first graph data and the second graph data using aggregated fields of the first field and the third field as a unique identifier of a unified schema for nodes within the unified graph having a first type and aggregated fields of the first field and the fourth field as a unique identifier of the unified schema for nodes within the unified graph having a second type, wherein nodes of the unified graph represent entities and edges of the unified graph represent relationships among the entities.

In another aspect, a system for generating a unified graph is provided. The system includes a first data source of the enterprise organization that stores first graph data, a second data source of the enterprise organization that stores second graph data, a node processor, and a unified data store configured to store the unified graph. The node processor is configured to receive requests for the unified graph data, obtain the first graph data from the first data source and the second graph data from the second data source, and generate a unified graph based on the first graph data and the second graph data using aggregated fields of the first field and the third field as a unique identifier of a unified schema for nodes within the unified graph having a first type and aggregated fields of the first field and the fourth field as a unique identifier of the unified schema for nodes within the unified graph having a second type. Nodes of the unified graph represent entities associated with the enterprise organization and edges of the unified graph represent relationships among the entities.

In yet another aspect, a system for generating a unified graph is provided. The system includes at least one processor and at least one memory storing computer-executable instructions that when executed by the at least one processor cause the at least one processor to: receive first graph data from a first data source of an enterprise organization, nodes within the first graph data including at least a first field, a second field, and one or more third fields; receive second graph data from a second data source of the enterprise organization, nodes within the second graph data including at least the first field, the second field, and one or more fourth fields; and generate the unified graph from the first graph data and the second graph data using aggregated fields of the first field and the third field as a unique identifier of a unified schema for nodes within the unified graph having a first type and aggregated fields of the first field and the fourth field as a unique identifier of the unified schema for nodes within the unified graph having a second type, wherein nodes of the unified graph represent entities associated with the enterprise organization and edges of the unified graph represent relationships among the entities.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS/FIGURES

Non-limiting and non-exhaustive examples are described with reference to the following Figures.

FIG. 3 shows a diagram of an example of a unified schema for generating a unified graph, according to an example embodiment.

DETAILED DESCRIPTION

Figure 1:
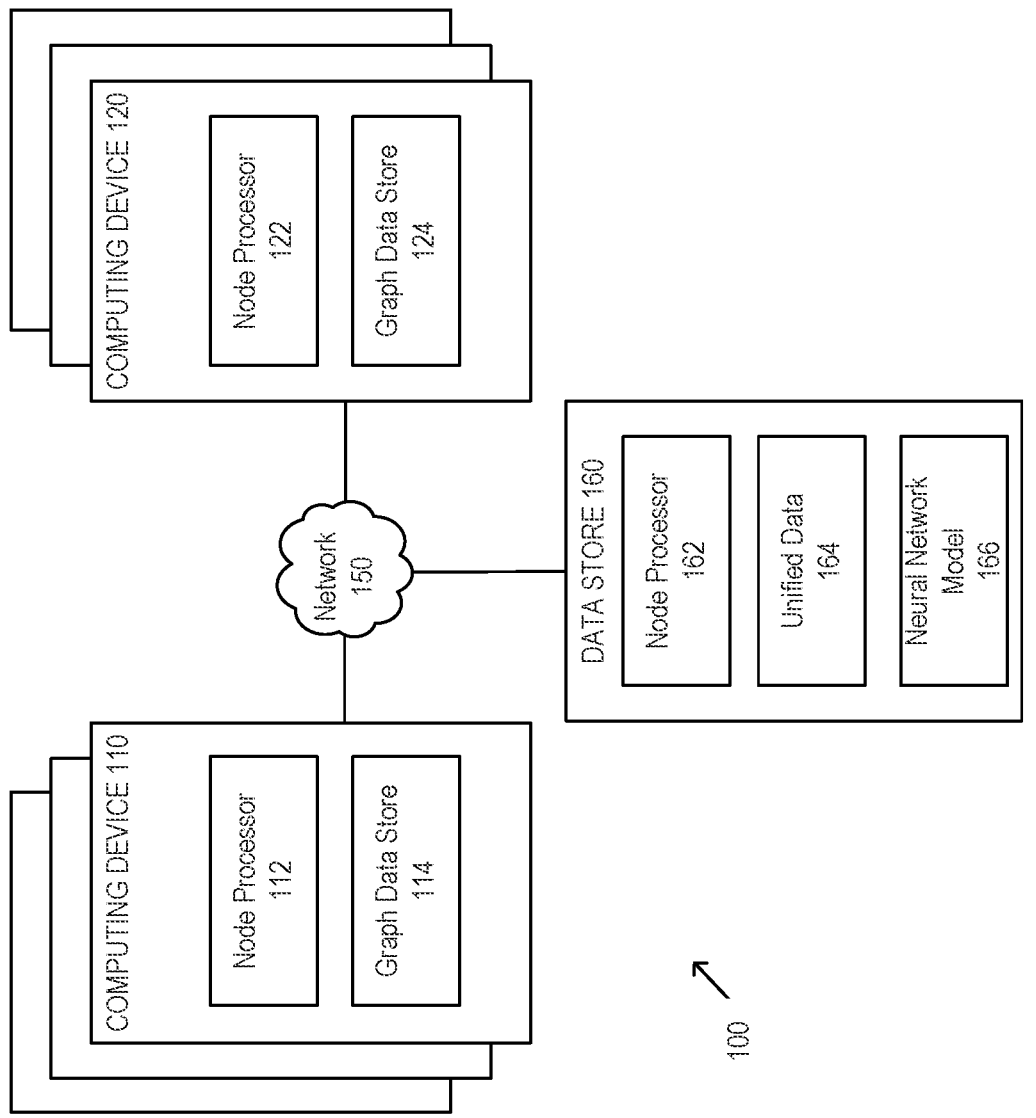
FIG. 1 shows a block diagram of an example of a data graph processing system that is configured to, according to an example embodiment.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Data graphs may be generated where nodes represent entities associated with an enterprise organization and edges between the nodes represent relationships among the entities. The nodes may represent entities such as users, documents, emails, meetings, and conversations, while the edges represent relationships, such as document authorship, document modification, document sharing, meeting invites, linked data between documents, email sending, email replying, etc. Data graphs often contain information that improves searches, predictions, recommendations, entity-entity lookups, clustering, and other processing scenarios, but efficient generation of a data graph encompassing an entire organization is challenging when source data for the data graph is located in different data graphs, particularly when those data graphs have different schemas or formats, originate from different sources or software products, etc.

In examples described herein, a unified graph is generated from graph data received from different source computing devices. The source computing devices may store graph data according to different schemas, for example, with different unique identifiers for identifying nodes (e.g., entries or records). The schema generally indicates fields that are present for the graph data, such as a Document Identifier field that uniquely identifies a document in a document data store, an Email Identifier field that uniquely identifies an email in an email data store, an Author field that identifies an author of an email or document, a CreatedOn field that indicates a timestamp of when a document or email was created, etc. However, even when a Document Identifier field is available for a document, for example, when graph data that represents the document is combined with graph data that represents an email with an Email Identifier field having a same value, the uniqueness of the identifiers is lost and the email and document cannot be distinguished from each other on the basis of the corresponding identifier fields.

A node processor is configured to combine the graph data from different source computing devices into the unified graph. Instead of relying only on respective unique identifiers from the source computing devices, the node processor uses a unified schema based on a plurality of fields as a unique identifier. As one example, the node processor uses a first field and a second field as the unique identifier for nodes within the unified graph, where the first field may be an entity identifier (e.g., the Document Identifier for a document or the Email Identifier for an email) and the second field may be an entity type (e.g., indicating whether the entity is a document, an email, etc.). Other combinations of first and second fields (and additional fields, in some examples), will be apparent to those skilled in the art. Moreover, in some examples, the first and second fields are from different sources.

By using the unified schema, data from different user applications for the enterprise organization may be combined—breaking traditional "siloes" of information and entities across a plurality of data sources—enabling advanced analysis of entities and relationships across different platforms. Advantageously, the source computing devices do not need to be modified to include (or to generate) a global unique identifier for an entity that is unique across the entire enterprise organization wherever references to that entity may be found. Processing and management of global unique identifiers, which becomes challenging for consistency across multiple platforms, is thus avoided.

In accordance with embodiments of the present disclosure, FIG. 1 depicts an example of a data graph processing system 100 that is configured to generate a unified graph. The data graph processing system 100 includes one or more computing devices 110 and computing devices 120 and a data store 160. A network 150 communicatively couples computing device 110, computing device 120, and data store 160. The network 150 may comprise one or more networks such as local area networks (LANs), wide area networks (WANs), enterprise networks, the Internet, etc., and may include one or more of wired, wireless, and/or optical portions.

Computing device 110 may be any type of computing device, including a mobile computer or mobile computing device (e.g., a Microsoft® Surface® device, a laptop computer, a notebook computer, a tablet computer such as an Apple iPad™, a netbook, etc.), or a stationary computing device such as a desktop computer or PC (personal computer). Computing device 110 may be configured to execute one or more software applications (or "applications") and/or services and/or manage hardware resources (e.g., processors, memory, etc.), which may be utilized by users of the computing device 110 and/or the computing device 120. The computing device 120 may be similar to the computing device 110, or may include one or more server devices, distributed computing platforms, cloud platform devices, and/or other computing devices. In some examples, both the computing devices 110 and computing devices 120 are mobile computing devices, stationary computing devices, server devices, distributed computing platforms, cloud platform devices. For ease of discussion, the description herein refers to a single computing device 110 and 120, but features and examples of the computing device 120 are applicable to two, three, or more instances of the computing devices 110 and 120.

The computing device 110 and the computing device 120 are referred to herein as source computing devices or data sources in that they provide graph data for graphs that represent entities (e.g., of an enterprise organization or business organization) and corresponding relationships among the entities. Various examples of entities are contacts (e.g., users), emails, meetings, documents, topics, messages, conversations, channels or news feeds, acronyms, definitions, key phrases, or other suitable entities. Examples of relationships are document authorship, document modification, document sharing, meeting invites, linked data between documents, email sending, email replying, or other suitable relationships. The computing devices 110 and 120 may also manage, modify, and/or store the graph data.

The computing device 110 comprises a node processor 112 configured to generate and/or process graph data and a graph data store 114 configured to store the graph data. The computing device 120 comprises a node processor 122 and a graph data store 124, which are generally similar to the node processor 112 and the graph data store 114, respectively. The node processors 112 and 122 may be implemented as software modules, application specific integrated circuits (ASICs), firmware modules, or other suitable implementations, in various embodiments. The graph data stores 114 and 124 may be implemented as one or more of any type of storage mechanism, including a magnetic disc (e.g., in a hard disk drive), an optical disc (e.g., in an optical disk drive), a magnetic tape (e.g., in a tape drive), a memory device such as a random access memory (RAM) device, a read-only memory (ROM) device, etc., and/or any other suitable type of storage medium.

Generally, the computing devices 110 and 120 may correspond to a user application or user service for the enterprise organization, where the user application facilitates the use and/or storage of data for, or about, entities of the enterprise organization. Example user applications include email applications (e.g., Microsoft Outlook), messaging applications (e.g., Microsoft Teams), social networks or professional networks (e.g., LinkedIn), search applications (e.g., Bing), document repository applications (e.g., Microsoft SharePoint), or other suitable applications and services. The user applications may be referred to as graph data generators in that they generate data about entities (e.g., documents, emails, contacts) and relationships among those entities.

In some examples, the computing devices 110 and 120 generate graph data independently from each other. In other words, the computing device 110 may provide an Outlook email service and generate graph data related to emails and contacts, while the computing device 120 may provide a SharePoint document service and generate graph data related to documents, with one or both of the computing devices 110 and 120 generating the graph data independent from the other computing device. Different user applications may have access to additional information about an entity, so improved knowledge about an entity is obtained when graph data from different user applications (or different access levels) is combined. For example, a text document may be authored and sent by a first user to a second user in an email using an Outlook email application, while the text document may also be shared with a third user by the second user in a Teams messaging application. By combining graph data from both the email application and the messaging application, knowledge of a relationship between the text document and the third user (e.g., a Viewed relationship) is made available to the Outlook email application and knowledge of a relationship between the text document and the first user (e.g., an Author relationship) is made available to the messaging application. This knowledge provided to both applications allows for more accurate recommendations and predictions, in various scenarios, such as when recommending files to attach to an email or recipients of an email. Moreover, an additional relationship between the first user and the third user may be identified and a corresponding new edge generated for the unified graph. This new edge may be populated or pushed into the graph data of the Outlook email application and/or the graph data of the messaging application. As one example, the computing device 110 may correspond to an email application and the computing device 120 may correspond to a Teams messaging application.

The node processor 112 is configured to generate graph data (e.g., graph data 200, FIG. 2) for the corresponding user application (e.g., Outlook) and store the graph data in the graph data store 114. Similarly, the node processor 122 is configured to generate graph data (e.g., graph data 250, FIG. 2) for the corresponding user application (e.g., Teams) and store the graph data in the graph data store 124. As will be understood by those skilled in the art, the graph data stores 114 and 124 store the graph data about the entities (e.g., documents, messages, etc.), while the entities themselves may be stored in the graph data stores, separate data stores (not shown), or other suitable locations.

The data store 160 is configured to store data, for example, a neural network model 166 and unified data 164. In various embodiments, the data store 160 is a network server, cloud server, network attached storage ("NAS") device, or other suitable computing device. Data store 160 may include one or more of any type of storage mechanism, including a magnetic disc (e.g., in a hard disk drive), an optical disc (e.g., in an optical disk drive), a magnetic tape (e.g., in a tape drive), a memory device such as a random access memory (RAM) device, a read-only memory (ROM) device, etc., and/or any other suitable type of storage medium. Although only one instance of the data store 160 is shown in FIG. 1, the data graph processing system 100 may include two, three, or more similar instances of the data store 160. Moreover, the network 150 may provide access to other data stores, similar to data store 160 that are located outside of the data graph processing system 100, in some embodiments.

The data store 160 may also include a node processor 162. The node processor 162 is configured to combine graph data from different source computing devices into a unified graph (e.g., unified data 164), as described herein. In some examples, the node processor 162 is similar to the node processors 112 and 122. In some examples, the node processor 162 is implemented as a standalone computing device or server, similar to the computing device 110 or 120. The node processor 162 may be configured to utilize a neural network model (or machine learning model), such as the neural network model 166, to generate embeddings for unified data 164 or other suitable analysis. Generally, the unified data 164 is a representation of entities associated with an organization along with relationships among the entities. In some examples, the unified data 164 generally corresponds to the data graph 400 (FIG. 4) and may be stored as one or more data structures, database entries, or other suitable format.

In accordance with examples of the present disclosure, the node processor 162 may receive a request for graph data based on the unified data 164. In various examples, the request may be one of many different types, for example, a request for candidate generation (e.g., files to be attached to an email), a request for relevant entities for a search (e.g., files related to a topic), a request for automatic suggestions or recommendations of entities (e.g., users to be included on an email or meeting request), a request for synthesis of entities, or other suitable request types. The graph data provided in response to a request may include embeddings, nodes of the data graph 400, edges of the data graph 400, documents or files corresponding to the nodes or edges, or identifiers (e.g., unique identifiers, links, file locations, etc.) that correspond to the nodes and/or edges. In other words, the request may be referred to as a request for embeddings, nodes, edges, documents, files, users, meetings, etc. that are related to a search query.

In some examples, the node processor 162 provides the information to the neural network model 166 executing at a neural processing unit. The neural network model 166 (or other suitable machine learning model) may then generate the search embedding or provide other suitable graph processing or analysis. Because the neural processing unit is specifically designed and/or programmed to process neural network tasks, the consumption of resources, such as power and/or computing cycles, is less than the consumption would be if a central processing unit were used.

In some examples, the graph data stores 114 and/or 124 include data in alternative formats, such as a log file, telemetry file, entities, that is stored/used in accordance with privacy and compliance policies of enterprises. In some examples, the node processor 112 processes the data in alternative formats, such as a log file or telemetry file, and generates new graph data (e.g., nodes and/or edges) for storage in the graph data store 114.

Figure 2:
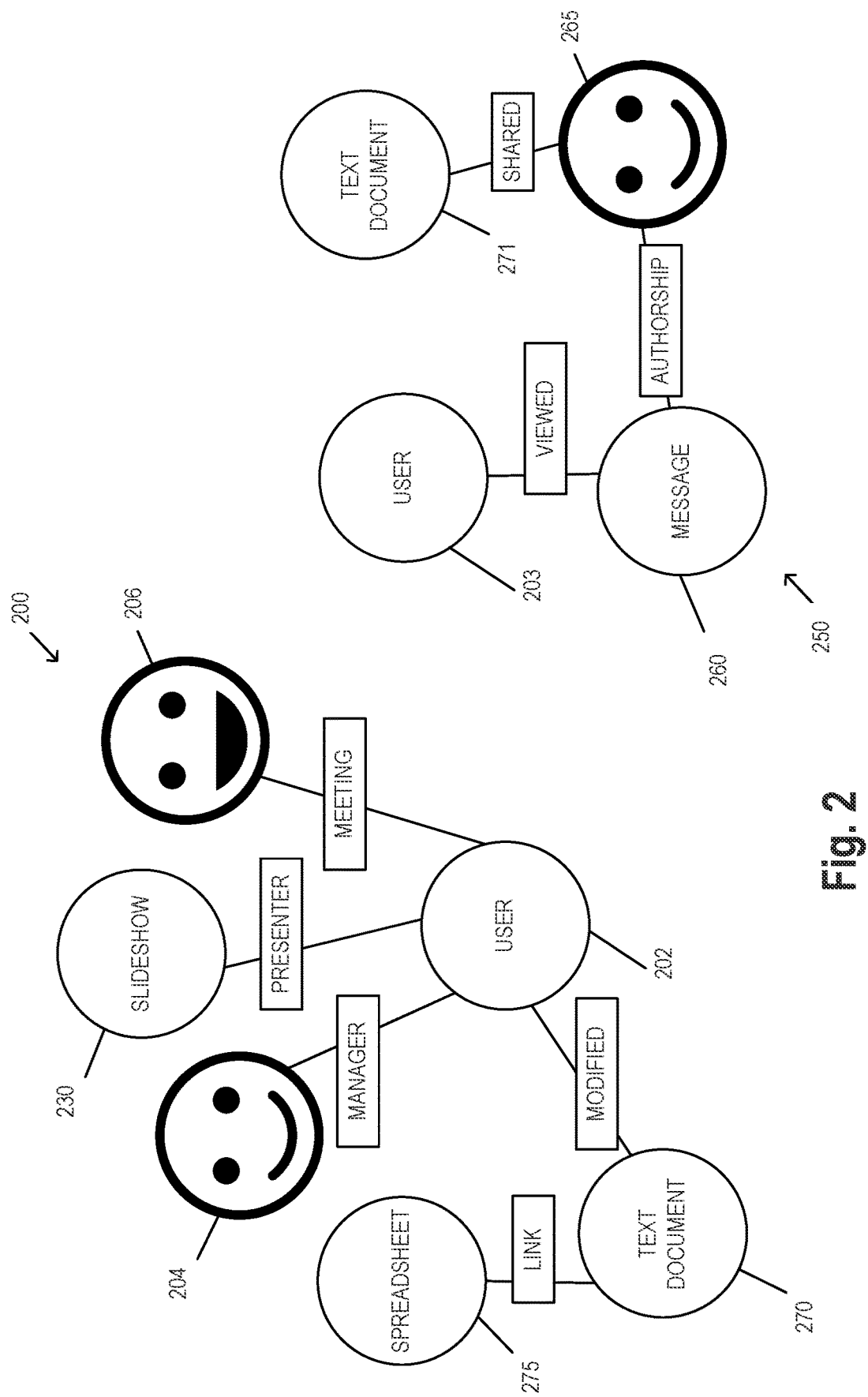
FIG. 2 shows a diagram of an example of source data graphs, according to an example embodiment.

FIG. 2 depicts an example of source data graphs 200 and 250, according to an embodiment. The data graphs 200 and 250 generally correspond to an enterprise organization, business, work group, or other suitable domain, in various examples, but are implemented as separate data graphs. In some examples, the source data graph 200 is provided by the computing device 110 (e.g., associated with an email application) while the source data graph 250 is provided by the computing device 120 (e.g., associated with a messaging application). Accordingly, the source data graph 200 and the source data graph 250 may be considered sub-graphs of a unified graph (e.g., unified graph 400, FIG. 4) for the enterprise organization, where the sub-graphs are generated in an isolated environment from each other.

The source data graphs 200 and 250 have nodes representing entities associated with the enterprise organization and edges between nodes representing relationships among the entities. In some examples, the data graphs 200 and 250 are data and interaction graphs that contain information related to interactions with entities, for example, where the interactions are represented by the edges between nodes. Examples of the entities may include documents (e.g., spreadsheets, text documents, videos, images, etc.), files, users (e.g., employees, clients, vendors), emails, messages, meetings, organizational groups (e.g., accounting, research and development, etc.), topics, topic-based groups (e.g., users that have searched for or created documents associated with a topic), or other suitable entities. The relationships between entities may include document authorship or modification by a user (or group), document sharing by a user, meeting invites or attendance by a user, linked data between documents, comments and/or replies to comments, emails and email replies, or other suitable relationships. In some scenarios, multiple different relationships are present between two or more nodes. For example, a user may modify a slideshow (modification relationship), present the slideshow (presenter relationship), share the slideshow (sharing relationship), etc.

In the example shown in FIG. 2, the data graph 200 includes user nodes 202, 204, and 206, slideshow node 230, text document node 270, and spreadsheet node 275, while the data graph 250 includes a user node 203, a user node 265, a message node 260, and a text document node 271. The user node 202 may represent a first employee of an enterprise organization, while the user node 204 represents a second employee that is the first employee's manager. In other words, the user node 202 and the user node 204 share a manager relationship represented by an edge in the data graph 200. The slideshow node 230 may represent a PowerPoint presentation that the first employee has previously presented so that the user node 202 and the slideshow node 230 share a presenter relationship. The user node 206 may represent a third employee that attended a meeting with the first employee so that the user node 202 and the user node 206 share a meeting relationship.

The user node 203 of the data graph 250 represents the first employee, thus representing the same employee as the user node 202 of the data graph 200, but within a context of the messaging application (instead of a context of the email application). Similarly, the text document node 271 represents a same text document as the text document node 270 within the context of the messaging application. The user node 265 may represent a fourth employee that has authored a message (message node 260), where the message was viewed by the first employee (user node 203). The fourth employee may also have shared the text document (text document node 271). Accordingly, the fourth employee (user node 265) has shared the text document (node 271, node 270) that was authored by the first employee (node 202, node 203). However, this authorship relationship of the shared text document is not visible within the context of the messaging application. As described herein, the node processor 162 is configured to combine the data graph 200 and the data graph 250, combining the corresponding nodes and relationships and providing additional insights to the entities of the enterprise organization.

Some nodes within the data graph 200 may not be directly related to another, but are related through one, two, three, or more intermediate nodes. For example, the message node 260 shares a viewed relationship with the user node 203 (e.g., the first employee has viewed a comment or message represented by the message node 260) while the user node 265 represents a fourth employee who has authored the message (e.g., the fourth employee has an authorship relationship with the message node 260). As another example, the text document node 270 may represent a text document that contains a link to data within a spreadsheet represented by the spreadsheet node 275 (e.g., a link relationship between the text document node 270 and the spreadsheet node 275). Although only a small number of nodes are shown in FIG. 2 for clarity, it will be appreciated that an enterprise organization with hundreds or thousands of employees and their associated documents, meeting calendars, etc. may have millions of nodes with billions of edges for relationships among those nodes. Moreover, these nodes and relationships may originate within two, three, or more different data sources (e.g., the computing devices 110 and/or 120).

In various examples, nodes of the data graph 200 include content, metadata, or both content and metadata. For example, content of the slideshow node 230 may include text, images, and animations that appear within the corresponding slideshow. Metadata may include a number of times that the slideshow has been presented, viewed, or modified, a file size or slide count, times when the slideshow was accessed, a duration of time since a most recent access, etc. Some nodes of the data graph 200 may contain metadata that is not present within other nodes.

FIG. 3 shows a diagram of an example of a unified schema 300 for generating a unified graph, according to an example embodiment. As described above, the data graph processing system 100 avoids the challenges of processing and management of global unique identifiers by using an aggregate of fields as a unique identifier. In the unified schema 300 of FIG. 3, the unified schema 300 has core fields 310, type-based fields 320, and custom fields 330.

Generally, the core fields 310 are those fields that are universal to describe characteristics for an entity but, in some scenarios, may not be sufficient to uniquely identify an entity (e.g., when entities are combined from across multiple divisions of a large enterprise or business). Core fields may be required, in some examples. In the example shown in FIG. 3, the core fields 310 include an identifier field 312 (e.g., a unique or mostly unique identifier) and a Type field 314. The Type field 314 indicates a type of a particular entity and may be selected from a plurality of types for a schema. The unified schema 300 comprises an Email type, Document type, and Contact type (e.g., a user). In other examples, the unified schema 300 includes additional types (e.g., a Calendar type for meetings or appointments, a link type for URLs or other document links, an acronym type for commonly used acronyms within the enterprise, a key phrase type for commonly used phrases within the enterprise, a commitment type for tasks), or fewer types. In some examples, the core fields 310 also include other fundamental properties of the entities, such as a source identifier that indicates a data source from which an entity was first created (e.g., from graph data store 114 or 124, computing device 110 or 120).

Generally, the core fields 310 are present for each node in each of the graph data sources (e.g., within computing devices 110 and 120). When combined, the core fields 310 may provide aggregated fields with values (an ID and a type) that uniquely identify each node of a unified graph (e.g., graph 400). For example, a 32-bit identifier field provides nearly 4.3 trillion identifiers of a same type, which when combined with five additional types, results in 21.4 trillion available identifiers for entities (i.e., 4.3 trillion identifiers for each type). In some scenarios, additional fields are necessary or desired to uniquely identify entities within the unified graph, and the aggregated fields include at least some of the core fields 310, one or more of the type-based fields 320, or the source identifier that indicates the data source from which an entity was first created or another suitable field.

In some examples, the core fields 310 are defined by an owner of the node processor 162, in other words, by a unified graph administrator, rather than a source data graph administrator of a source data graph. In other examples, the core fields 310, the type-based fields 320, and the custom fields 330 are defined by an entity type administrator (e.g., a unified document administrator, a unified contact administrator, etc.). The entity type administrator may specify a default process for de-duplication of nodes corresponding to a same entity but from multiple different sources.

In the example shown in FIG. 3, the type-based fields 320 include a sender field 321 (e.g., an email address or other identifier for a sender of an email), a timestamp field 322 (e.g., indicating when an email was sent), a subject field 323 (e.g., containing a subject line of an email), an author field 324 (e.g., indicating a user that created a document), a language field 325 (e.g., indicating a language in which all or most of the text of an email, document, or contact is written), a template field 326 (e.g., indicating a document template used for a document), a display name field 327 (e.g., indicating how a user's name is to be displayed, such as "First name Last name" or "Last name, First name"), and an alias field 328 (e.g., indicating an email address, network login, or domain login for a user). In the example shown in FIG. 3, the fields 321, 322, and 323 are specific to entities of the Email type, the fields 324 and 326 are specific to entities of the Document type, and the fields 327 and 328 are specific to entities of the Contact type. The language field 325 is used by entities from each of the Email type, the Document type, and the Contact type. Other fields that are specific to an entity type or shared among multiple entity types will be apparent to those skilled in the art.

Generally, values for type-based fields 320 are populated or changed from a default value only for nodes of the unified graph having a particular type that corresponds to the field. For example, a Sender field is populated for nodes having an Email type, but is not typically populated for a Contact type where a contact is not typically "sent" as an email would be. However, some type-based fields 320 may be used and populated for several different types of nodes, in some examples. The Author field may be present to indicate an author of an email, of a document, or of a meeting invite. In some examples, the type-based fields 320 are jointly owned by the unified graph administrator and source data graph administrators.

The custom fields 330 allow for customization and flexibility in fields for the unified data graph. In some examples, a node may benefit from storing data that is more complex than a simple attribute. In these examples, a Map field may indicate a mapping between strings and corresponding objects, for example, to describe attachments to an email. The custom fields 330 may be customized by a unified graph administrator and/or a source data graph administrator.

In the example shown in FIG. 3, the aggregated fields used to uniquely identify the entities are different for different types of entities. As one example, the aggregated fields for entities having the Email type may be the ID field 312, the sender field 321, and the timestamp field 322. As another example, the aggregated fields for entities having the Contact type may be the ID field 312 and the alias field 328. Other combinations of core fields 310 and type-based fields 320 may be used as the aggregated fields for other entity types and may include two, three, four, or more fields, in other examples. After identification of the aggregated fields for uniquely identifying entities of a particular type, the node processor 162 may use the aggregated fields to identify and de-duplicate or otherwise combine nodes for the same entity.

Although each of the type-based fields 320 are shown empty (without text) for fields that are not populated (e.g., the sender field 321 for Id2 and Id3), in some examples, fields that are not populated are not present in a node. For example, fields within a node may be implemented as a two-part data structure with a first part that identifies the field name and a second part that identifies a value for the field of the identified type. In this way, storage space is not needed for a node for fields that are not populated.

Figure 4:
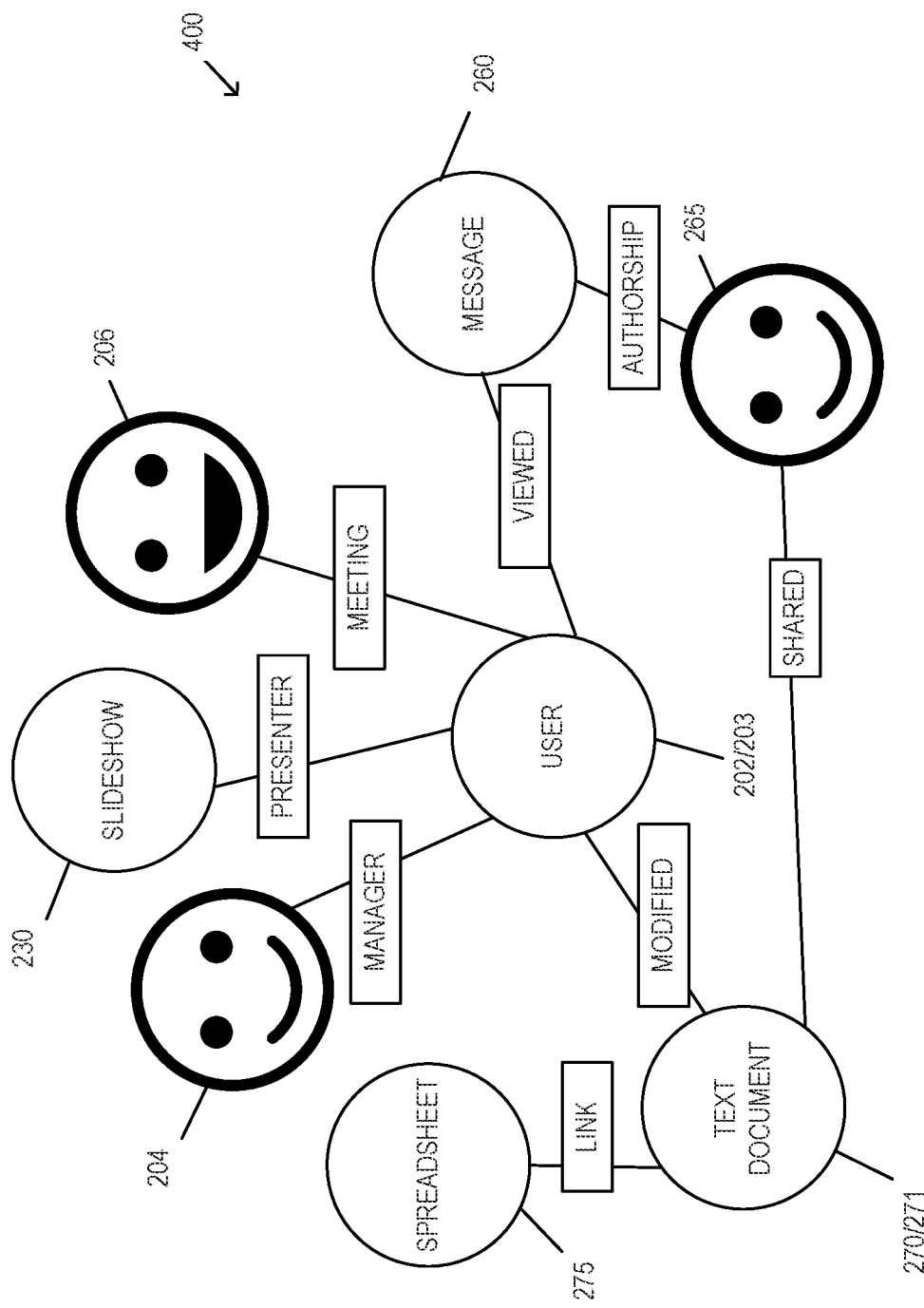
FIG. 4 shows a diagram of an example of a unified graph based on the source graphs of FIG. 2, according to an example embodiment.

FIG. 4 shows a diagram of an example of a unified graph 400 based on the source graphs 200 and 250 of FIG. 2, according to an example embodiment. Generally, the node processor 162 receives the source graphs 200 and 250 as graph data (e.g., first graph data and second graph data) and generates the unified graph 400 using the aggregated fields for the nodes of the graph data as a unique identifier of the unified schema 300 for nodes within the unified graph 400. One or more additional third fields of the source graph 200 (e.g., Sender, Timestamp, Subject, Language, and Map) along with one or more fourth fields of the source graph 250 (e.g., Language, Display Name, Alias) may also be combined into the unified graph 400.

In some examples, the first graph data corresponding to the source graph 200 is generated by the computing device 110 and has a format that is native or specific to the computing device 110. In these examples, the node processor 162 converts as needed (e.g., to the unified schema 300) and combines the first graph data with the second graph data. In other examples, the node processor 112 converts the first graph data into the unified schema 300 and provides the converted data to the node processor 162. Moreover, in various examples, the first graph data is generated as a raw format (e.g., as rows of a table containing only fields that are native to the computing device 110), as a processed format (e.g., as rows of a unified table, such as shown in FIG. 3), or as node data (e.g., as node-based data structures, graph views, or sub-graphs as shown in FIG. 4).

As shown in FIG. 4, the text document nodes 270 and 271 have been combined into a single node and the user node 202 and 203 have been combined into a single node using an aggregation process performed by the node processor 162, described below. Advantageously, the unified graph 400 provides a joined, distributed graph that is separate from graph data within the computing devices 110 and 120, which allows for changes to the unified graph 400 to be made without affecting consumers of data from the first and second graph data. Moreover, graph views or subsets of the unified graph 400 may be generated, for example, by filtering the unified graph 400 by entity type, relationship type, values of particular fields (e.g., core fields 310, type-based fields 320, custom fields 330), data source (e.g., computing device 110 or 120), time range, or other suitable criteria and provided back to the computing devices 110 or 120 for further analysis and deep learning. In this way, processing resources for machine learning based on the unified graph 400 is independent from other data sources and localized to a consumer of machine learning output.

Figure 5:
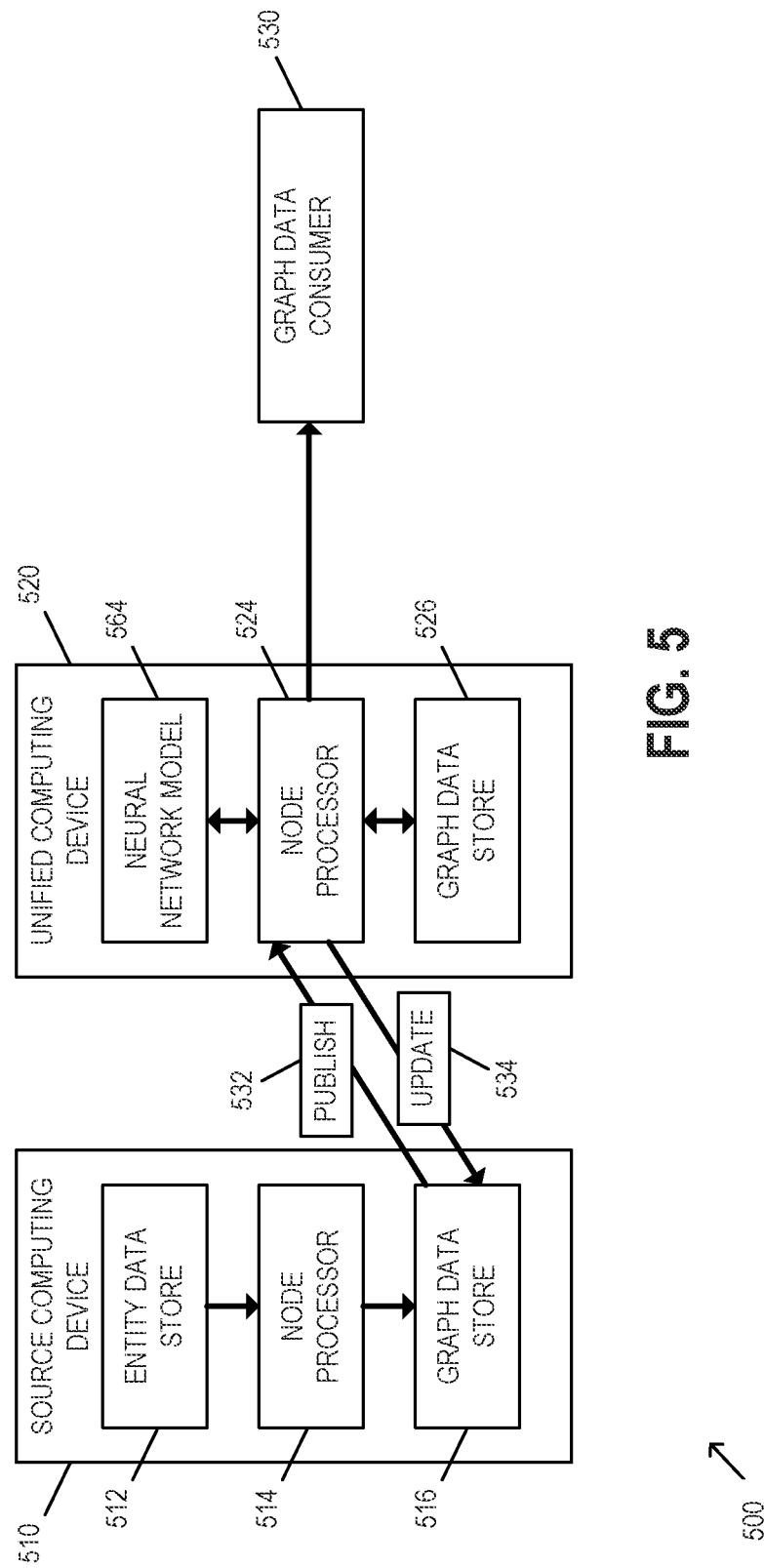
FIG. 5 shows a diagram of an example process flow for generating a unified graph, according to an example embodiment.

FIG. 5 shows a diagram of an example process flow 500 for generating a unified graph, according to an example embodiment. The process flow 500 is performed by a source computing device 510 (corresponding to computing device 110) and a unified computing device 520 (corresponding to computing device 120 and/or data store 160). The source computing device 510 comprises an entity data store 512 configured to store entities for an enterprise organization. For example, the entity data store 512 is a suitable storage mechanism that stores documents and contacts. In some examples, the entity data store 512 also stores signals that represent user interactions between the entities stored on the entity data store 512. The source computing device 510 also comprises a node processor 514 configured to process the entity data store 512, extract entity and edge information, generate suitable graph data, such as the data graph 200 and/or the data graph 250, and store the generated graph data in a graph data store 516 (e.g., corresponding to graph data store 114). The node processor 514 may extract the entity and edge information in an online manner (i.e., real-time or near real-time) as updates are made to the entities, or in an offline manner (e.g., at a scheduled time or time interval, such as every day at 10:00 PM, every Sunday at 4:00 PM, etc.). In some examples, the node processor 514 extracts the entity and edge information when particular changes occur, such as when a threshold number of entities have changed, or when higher priority entities have changed or been added.

The source computing device 110 is configured to publish 532 the data graph 200 by providing the data graph 200 (or corresponding data structures) to a node processor 524 of the unified computing device 520. The node processor 524 generally corresponds to the node processor 124 and/or 164 and is configured to aggregate fields within the graph data 200 and the graph data 250 (e.g., from another source computing device, not shown). For example, the node processor 524 aggregates the identifier field and the type field shown in FIG. 3 to form a unique identifier for the unified graph 400.

The node processor 524 is configured to combine or form a union of fields for nodes of the graph data 200 and 250 that have a same unique identifier for the unified graph 400. For example, the node processor 524 combines a relationship field corresponding to the Viewed relationship between the user 203 and the message node 260 and a relationship field corresponding to the Modified relationship between the user 202 and the text document node 270. As a result, the user node 202/203 has both the Viewed relationship with the message node 260 and the Modified relationship with the text document node 270/271.

When information for a node is located in multiple data sources, each data source may store different values for similar or same fields. In some examples, the node processor 524 performs one or more arbitration processes to select which information is incorporated into the unified graph 400. In one example, the arbitration process selects information with a more recent timestamp. In another example, the arbitration process prioritizes information from a high priority data source, for example, using Outlook instead of SharePoint when selecting information for a user node or email node.

In some scenarios, a data source such as the source computing device 510 does not have graph data 200 with suitable fields or identifiers that match the unified schema 300. Additionally, some fields may have an inconsistent format, range of values, or other inconsistency. In some examples, the node processor 524 (or the node processor 514) converts one or more fields from the data graph 200 to normalize values of some or all of the fields. In various examples, the node processor 524 normalizes values of only core fields (e.g., core fields 310), only aggregated identifier fields, or all fields that appear among different sources.

In one example, the node processor 524 performs a conversion routine to change values of fields that are inconsistent into a value that is consistent with the unified schema 300. For example, the conversion routine may convert an Azure Active Directory ID (AAD ID) for a user node within the graph data 200 into an email address. Since the AAD ID may not be available in some data sources (e.g., a non-Microsoft data source), conversion of the AAD ID to a more readily available value (i.e., an email address of the user) may improve matching of nodes among different data sources. As another example, the conversion routine may change integer values to float values, change integer values to strings, or perform other suitable conversions.

Advantageously, the conversion routine allows for an existing data graph to be incorporated into the unified graph 400 without having to change characteristics of the existing data graph itself. In other words, the conversion routine allows for a separation between representations of graph data that are internal to the source computing device 510 and representations of graph data that are external to the source computing device 510 (i.e., within the unified graph 400). This separation allows for evolving and changing how graph data may be constructed within the source computing device 510 without affecting users of the unified graph 400.

In some examples, the node processor 524 uses a neural network model 564 (generally corresponding to neural network model 166) to generate data or populate fields within the unified graph 400. Advantageously, the unified graph 400 includes additional nodes and relationships that may not be present within individual source computing devices, allowing for improved analysis of the relationships among entities within the enterprise organization.

The node processor 524 stores the unified graph 400 in a graph data store 526 (generally corresponding to unified data 164). When changes to fields are made in the unified graph 400 (e.g., due to normalization or arbitration, described above), the node processor 524 may push an update 534 back to the source computing device 510, causing the source computing device 510 to update the graph data store 516. In some examples, the node processor 524 provides some of the unified graph 400 to a graph data consumer 530. The graph data consumer 530 may be the computing device 110, the computing device 120, or a third party device (not shown) that uses graph data for the enterprise organization.

Figure 6:
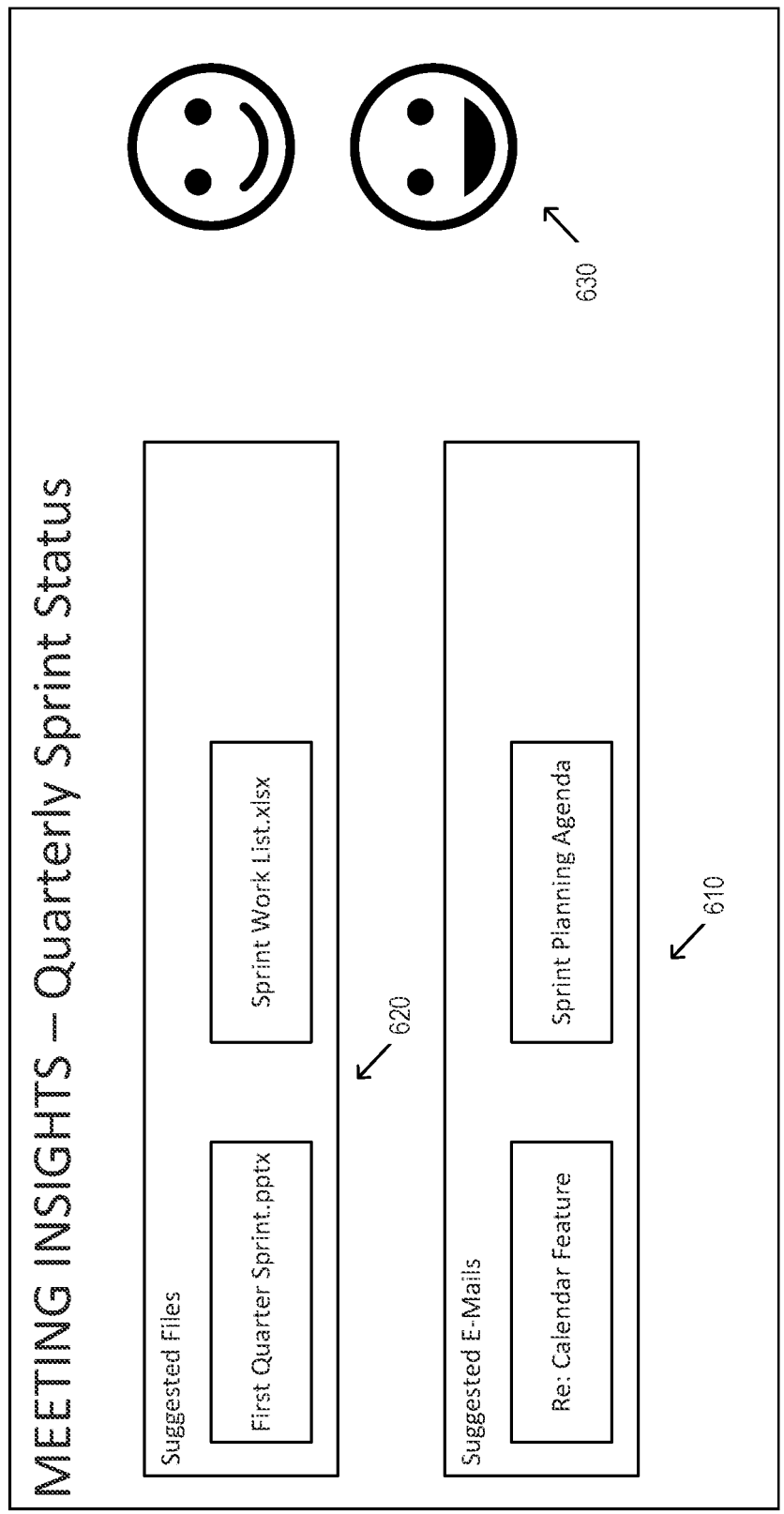
FIG. 6 shows a diagram of an example of a graphical user interface for providing graph data from a unified graph, according to an example embodiment.

FIG. 6 depicts an example of a graphical user interface 600 for providing graph data, according to an embodiment. Generally, the node processor 112 (or node processor 122, 162) may be configured to identify nodes that are similar, related, or adjacent to a given node or to a search query. The node processor 112 may identify the nodes either in response to a request from a user or automatically based on a suitable trigger (e.g., opening a user interface menu item, receiving an email, saving a document), in various examples. When using a node as a starting point, such as a node corresponding to a document displayed on a user interface, the node processor 112 uses a previously generated embedding (e.g., a user-level embedding) as a search embedding to perform a search for related nodes. When using a request or query as a starting point, the node processor 112 may generate the search embedding for the request based on the content of the request (e.g., based on key phrases within the request). The node processor 112 may then identify embeddings (from the set of previously generated embeddings for the data graph 200) that are adjacent to the search embedding based on a suitable distance metric.

In the example shown in FIG. 6, the graphical user interface 600 includes a meeting insights "tile" or pop-up for an email node corresponding to an emailed invite to a quarterly sprint status meeting. The graphical user interface 600 may include suggested e-mails 610, suggested files 620, and/or suggested users 630. To identify the suggested e-mails 610, the node processor 112 may select a set of embeddings for the data graph 200 that correspond to an email-only level of granularity (e.g., embeddings created while ignoring non-email nodes) and identify other embeddings that are adjacent to the embedding of the email node. To identify the suggested files 620 and the suggested users 630, the node processor 112 may select a set of embeddings for the unified graph 400 that correspond to a document and user level of granularity (e.g., embeddings created using only documents and users) and identify other embeddings that are adjacent to the embedding of the email node.

Figure 7:
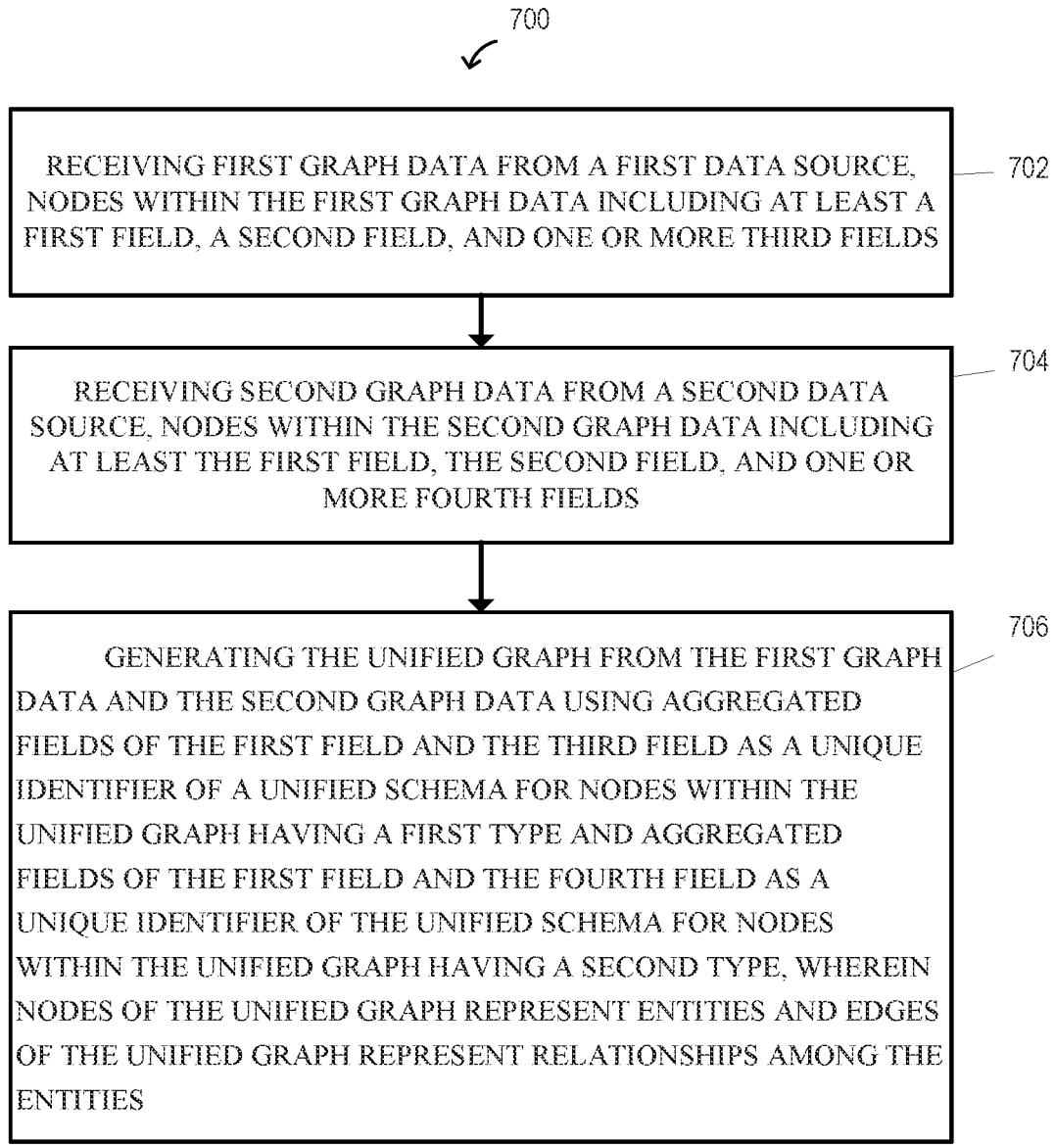
FIG. 7 shows a diagram of an example method for generating a unified graph, according to an example embodiment.

FIG. 7 shows a flowchart of an example method 700 of generating a unified graph, according to an example embodiment. Technical processes shown in these figures will be performed automatically unless otherwise indicated. In any given example, some steps of a process may be repeated, perhaps with different parameters or data to operate on. Steps in an example may also be performed in a different order than the top-to-bottom order that is laid out in FIG. 7. Steps may be performed serially, in a partially overlapping manner, or fully in parallel. Thus, the order in which steps of method 700 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 7 may be performed by the computing device 110 (e.g., via the node processor 112), the computing device 120 (via the node processor 122), or other suitable computing device.

Method 700 begins with step 702. At step 702, first graph data is received from a first data source. Nodes within the first graph data include at least a first field, a second field, and one or more third fields. In some examples, the first data graph corresponds to the data graph 200 (e.g., from a first instance of the source computing device 510).

At step 704, second graph data is received from a second data source, nodes within the second graph data including at least the first field, the second field, and one or more fourth fields. In some examples, the second data graph corresponds to the data graph 250 (e.g., from a second instance of the source computing device 510). In some examples, the first data source corresponds to a first user application (e.g., an Outlook application) and the second data source corresponds to a second user application (e.g., a Teams application). The first and second data sources may generate the first and second graph data independently from each other.

At step 706, the unified graph is generated from the first graph data and the second graph data using aggregated fields of the first field and the third field as a unique identifier of a unified schema for nodes within the unified graph having a first type and aggregated fields of the first field and the fourth field as a unique identifier of the unified schema for nodes within the unified graph having a second type. Nodes of the unified graph represent entities associated with the enterprise organization and edges of the unified graph represent relationships among the entities. For example, the node processor 524 generates the unified graph 400 from the graph data 200 and the graph data 250.

The unified graph is a heterogenous graph having nodes with different types, in some examples. For example, the unified graph 400 may include nodes for documents, emails, users, etc. The unified schema may have core fields that are populated for each node of the unified graph and type-based fields that are populated only for nodes of the unified graph having a particular type. For example, the unified schema may correspond to the unified schema 300, including core fields 310 and type-based fields 320.

In some examples, the first graph data represents a first sub-graph of nodes and edges according to a first schema and the second graph data represents a second sub-graph of nodes and edges according to a second schema. Generating the unified graph may include combining the first sub-graph and the second sub-graph to form the unified graph 400.

In an example, a first source node within the first graph data represents a first entity and a second source node within the second graph data represents the first entity. Generating the unified graph may include de-duplicating the first source node and the second source node within the unified graph, including generating a unified node having the first field, the second field, the one or more third fields, and the one or more fourth fields. In some examples, the method 700 includes aggregating the first field and the second field, including normalizing values of the first field of the first graph data and the first field of the second graph data. For example, the method 700 may include converting at least one of the first field of the first graph data and the first field of the second graph data into a unified field format.

In some examples, the method 700 includes generating a new edge of the unified graph between a first unified node and a second unified node, where the new edge represents a relationship that is not found in the first graph data or the second graph data. For example, the node processor 524 may generate a new relationship between nodes. The node processor 524 may push a graph data update (e.g., update 534) to at least one of the first data source and the second data source with the new edge.

In some examples, the method 700 also includes receiving a request for graph data based on a data graph, where the data graph has nodes representing entities associated with an enterprise organization, and edges between nodes representing relationships among the entities. The data graph corresponds to the unified graph 400, in some examples. The entities may include users, documents, emails, meetings, conversations, or other suitable entities associated with the enterprise organization, in various examples. The relationships may include document authorship by a user, document modification by a user, document sharing by a user, meeting invites from a user, linked data between documents, email sending, and email replying, or other suitable relationships, in various examples. The method 700 may also include generating a predicted relationship as the graph data. As one example, a predicted relationship for a comment may include a list of users who are likely to view the comment. As another example, a predicted relationship for a document may include a list of documents from which content may be copied.

In some examples, the method 700 includes receiving a request for graph data based on the unified graph where the request for graph data includes a request for nodes of the unified graph that are related to a search query, and generating a view of the unified graph in response to the search query, wherein the view includes a subset of nodes of the unified graph. In some examples, nodes or relationships (or both nodes and relationships) are filtered within the view according to entity type, relationship type, values of particular fields, data source, time range, or other suitable criteria. In other examples, the request for graph data is a request for edges between selected nodes of the unified graph and the graph data corresponds to predicted relationships between the selected nodes.

Figure 8:
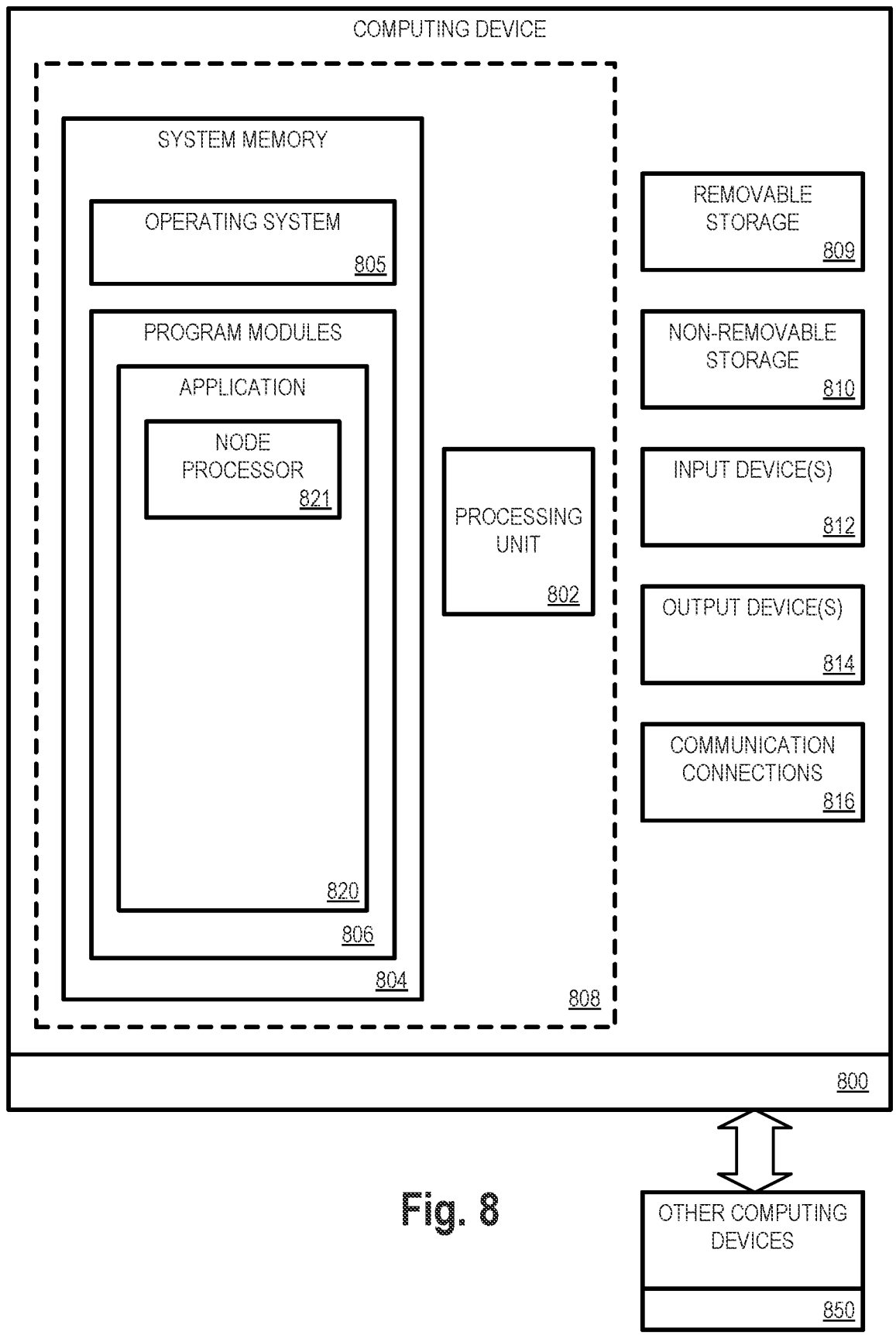
FIG. 8 is a block diagram illustrating example physical components of a computing device with which aspects of the disclosure may be practiced.
Figure 9:
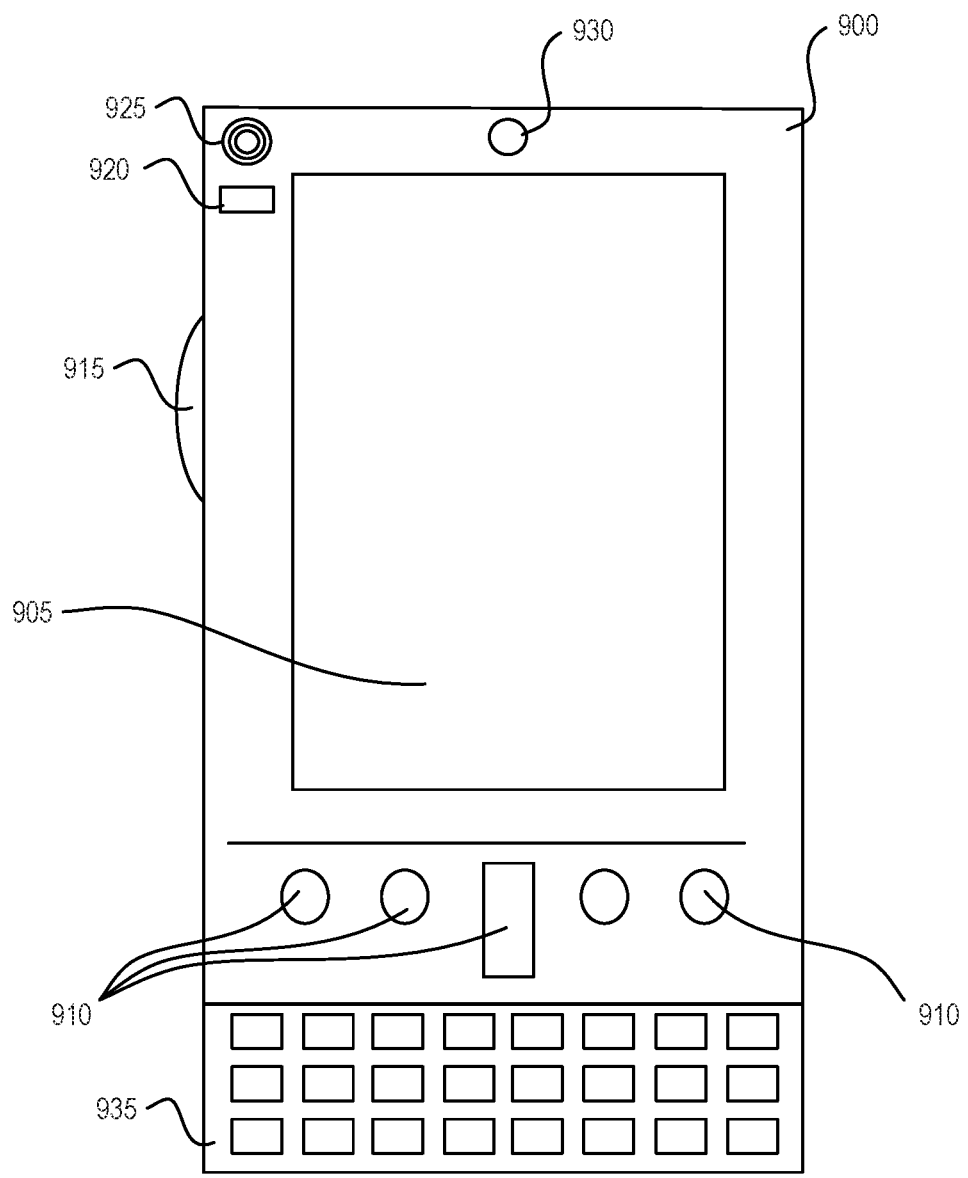
FIGS. 9 and 10 are simplified block diagrams of a mobile computing device with which aspects of the present disclosure may be practiced.
Figure 10:
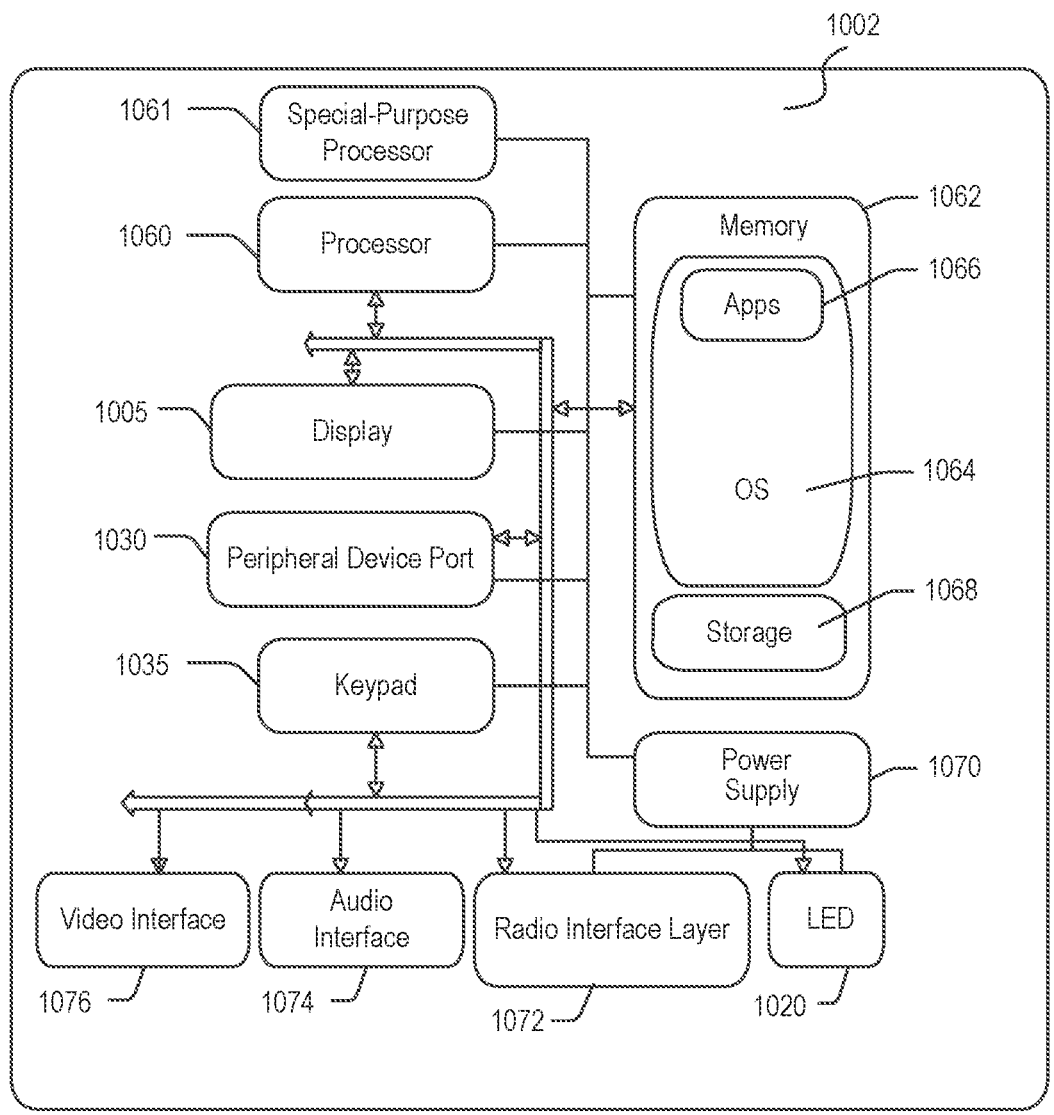

FIGS. 8, 9, and 10 and the associated descriptions provide a discussion of a variety of operating environments in which aspects of the disclosure may be practiced. However, the devices and systems illustrated and discussed with respect to FIGS. 8, 9, and 10 are for purposes of example and illustration and are not limiting of a vast number of computing device configurations that may be utilized for practicing aspects of the disclosure, as described herein.

FIG. 8 is a block diagram illustrating physical components (e.g., hardware) of a computing device 800 with which aspects of the disclosure may be practiced. The computing device components described below may have computer executable instructions for implementing a node processor application 820 on a computing device (e.g., computing device 110), including computer executable instructions for node processor application 820 that can be executed to implement the methods disclosed herein. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 suitable for running node processor application 820, such as one or more components with regard to FIG. 1 or FIG. 5, and, in particular, node processor 821 (e.g., corresponding to node processor 112, 122, 514, or 524).

The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., node processor application 820) may perform processes including, but not limited to, the aspects, as described herein. Other program modules that may be used in accordance with aspects of the present disclosure, and in particular for generating a unified graph, may include node processor 821.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 9 and 10 illustrate a mobile computing device 900, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 9, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some embodiments. In yet another alternative embodiment, the mobile computing device 900 is a portable phone system, such as a cellular phone. The mobile computing device 900 may include a front-facing camera 930. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 10 is a block diagram illustrating the architecture of one aspect of a mobile computing device. That is, the mobile computing device 900 can incorporate a system (e.g., an architecture) 1002 to implement some aspects. In one embodiment, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone. The system 1002 may include a display 1005 (analogous to display 905), such as a touch-screen display or other suitable user interface. The system 1002 may also include an optional keypad 1035 (analogous to keypad 935) and one or more peripheral device ports 1030, such as input and/or output ports for audio, video, control signals, or other suitable signals.

The system 1002 may include a processor 1060 coupled to memory 1062, in some examples. The system 1002 may also include a special-purpose processor 1061, such as a neural network processor. One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as email or other messages used by an email application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer.

The system 1002 has a power supply 1070, which may be implemented as one or more batteries. The power supply 1070 may further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 1020 may be used to provide visual notifications, and/or an audio interface 1074 may be used for producing audible notifications via an audio transducer 925 (e.g., audio transducer 925 illustrated in FIG. 9). In the illustrated embodiment, the visual indicator 1020 is a light emitting diode (LED) and the audio transducer 925 may be a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 925, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of peripheral device port 1030 (e.g., for an on-board camera) to record still images, video stream, and the like.

A mobile computing device 900 implementing the system 1002 may have additional features or functionality. For example, the mobile computing device 900 may also include additional data storage devices (removable and/or non-removable) such as, magnetic disks, optical disks, or tape. Such additional storage is illustrated in FIG. 10 by the non-volatile storage area 1068.

Data/information generated or captured by the mobile computing device 900 and stored via the system 1002 may be stored locally on the mobile computing device 900, as described above, or the data may be stored on any number of storage media that may be accessed by the device via the radio interface layer 1072 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 1072 or via a distributed computing network. Similarly, such data/information may be readily transferred between computing devices for storage and use according to well-known data/information transfer and storage means, including electronic mail and collaborative data/information sharing systems.

As should be appreciated, FIGS. 9 and 10 are described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method of generating a unified graph, the method comprising:
    receiving first graph data for a first data graph from a first data source, wherein the first data graph includes first source nodes associated with at least a first field, a second field, and one or more third fields;
    receiving second graph data for a second data graph from a second data source, wherein the second data graph includes second source nodes associated with at least the first field, the second field, and one or more fourth fields; and
    generating a first unique identifier of a unified schema by aggregating the first field and a third field of the unified schema, wherein the first unique identifier is used for identifying nodes within the unified graph having a first type;
    generating a second unique identifier of the unified schema by aggregating the first field and a fourth field of the unified schema, wherein the second unique identifier is used for identifying nodes within the unified graph having a second type;
    generating the unified graph from the first graph data and the second graph data using the first unique identifier and the second unique identifier, wherein each node of the unified graph represents an entity and each edge between two nodes of the unified graph represents relationships among entities associated with the two nodes.

2. The method of claim 1, wherein:
    the first graph data represents a first sub-graph of nodes and edges according to a first schema and the second graph data represents a second sub-graph of nodes and edges according to a second schema; and
    generating the unified graph comprises: combining the first sub-graph and the second sub-graph to form the unified graph.

3. The method of claim 2, wherein:
    a first source node within the first graph data represents a first entity and a second source node within the second graph data represents the first entity; and
    generating the unified graph comprises de-duplicating the first source node and the second source node within the unified graph, including generating a unified node having the first field, the second field, the one or more third fields, and the one or more fourth fields.

4. The method of claim 3, wherein generating the unified graph comprises aggregating the first field and the second field, including normalizing values of the first field of the first graph data and the second field of the second graph data.

5. The method of claim 4, wherein normalizing the values comprises converting at least one of the first field of the first graph data and the first field of the second graph data into a unified field format.

6. The method of claim 2, wherein:
    the first data source corresponds to a first user application;
    the second data source corresponds to a second user application; and
    the first and second data sources generate the first and second graph data independently from each other.

7. The method of claim 1, wherein the unified graph is a heterogenous graph having nodes with different types.

8. The method of claim 7, wherein the unified schema has core fields that are populated for each node of the unified graph and type-based fields that are populated only for nodes of the unified graph having a particular type.

9. The method of claim 1, further comprising:
    generating a new edge of the unified graph between a first unified node and a second unified node, wherein the new edge represents a relationship that is not found in the first graph data or the second graph data; and
    pushing a graph data update to at least one of the first data source and the second data source with the new edge.

10. The method of claim 1, wherein:
    the entities include users, documents, emails, meetings, and conversations; and the relationships include document authorship, document modification, document sharing, meeting invites, linked data between documents, email sending, and email replying.

11. The method of claim 1, further comprising:
receiving a request for graph data based on the unified graph, the request for graph data including a request for nodes of the unified graph that are related to a search query; and
generating a view of the unified graph in response to the search query, wherein the view includes a subset of nodes of the unified graph.

12. The method of claim 1, further comprising:
receiving a request for graph data based on the unified graph; and
wherein the request for graph data is a request for edges between selected nodes of the unified graph and the graph data corresponds to predicted relationships between the selected nodes.

13. A system for generating a unified graph, the system comprising:
a first data source that stores first graph data;
a second data source that stores second graph data;
a node processor configured to:
receive requests for the unified graph data,
obtain the first graph data for a first data graph from the first data source and the second graph data for a second data graph from the second data source,
generate a first unique identifier of a unified schema by aggregating the first field and a third field of the unified schema, wherein the first unique identifier is used for identifying nodes within the unified graph having a first type;
generate a second unique identifier of the unified schema by aggregating the first field and a fourth field of the unified schema, wherein the second unique identifier is used for identifying nodes within the unified graph having a second type, and
generate a unified graph based on the first graph data and the second graph data using the first unique identifier and the second unique identifier; and
a unified data store configured to store the unified graph;
wherein each node of the unified graph represents an entity and each edge between two nodes of the unified graph represents relationships among entities associated with the two nodes.

14. The system of claim 13, wherein the first data source stores data for a first user application according to a first schema and the second data source stores data for a second user application according to a second schema.

15. The system of claim 14, wherein the first data source and the second data source generate the first and second graph data independently from each other.

16. The system of claim 13, wherein the node processor is configured to generating the unified graph by de-duplicating related nodes within the unified graph that represent a same entity.

17. A system for generating a unified graph, the system comprising:
at least one processor, and
at least one memory storing computer-executable instructions that when executed by the at least one processor cause the at least one processor to:
receive first graph data for a first data graph from a first data source, wherein the first data graph includes first source nodes associated with at least a first field, a second field, and one or more third fields;
receive second graph data for a second data graph from a second data source, wherein the second data graph includes second source nodes associated with at least the first field, the second field, and one or more fourth fields;
generating a first unique identifier of a unified schema by aggregating the first field and a third field of the unified schema, wherein the first unique identifier is used for identifying nodes within the unified graph having a first type;
generating a second unique identifier of the unified schema by aggregating the first field and a fourth field of the unified schema, wherein the second unique identifier is used for identifying nodes within the unified graph having a second type; and
generate the unified graph from the first graph data and the second graph data using the first unique identifier and the second unique identifier, wherein each node of the unified graph represents an entity and each edge between two nodes of the unified graph represents relationships among entities associated with the two node.

18. The system of claim 17, wherein:
the first graph data represents a first sub-graph of nodes and edges according to a first schema;
the second graph data represents a second sub-graph of nodes and edges according to a second schema; and
the computer-executable instructions cause the at least one processor to combine the first sub-graph and the second sub-graph to form the unified graph.

19. The system of claim 18, wherein:
a first source node within the first graph data represents a first entity and a second source node within the second graph data represents the first entity; and
the computer-executable instructions cause the at least one processor to de-duplicate the first source node and the second source node within the unified graph, including generating a unified node having the first field, the second field, the one or more third fields, and the one or more fourth fields.

20. The system of claim 19, wherein the computer-executable instructions cause the at least one processor to aggregate the first field and the second field, including normalizing values of the first field of the first graph data and the first field of the second graph data.

* * * * *